US012693306B2

(12) United States Patent
Zhang et al.

(10) Patent No.: US 12,693,306 B2
(45) Date of Patent: Jul. 28, 2026

(54) OCEAN CURRENT DETECTION DEVICE AND METHOD BASED ON DOUBLE-HELIX AND DOUBLE-CORE VIBRATION FIBER-OPTIC CABLE

(71) Applicant: Nanjing University, Nanjing (CN)

(72) Inventors: Yixin Zhang, Nanjing (CN); Chi Zhang, Nanjing (CN); Xuping Zhang, Nanjing (CN); Shuai Tong, Nanjing (CN); Shun Wang, Nanjing (CN); Chenyang Ding, Nanjing (CN); Feng Wang, Nanjing (CN)

( * ) Notice: Subject to any disclaimer, the term of this patent is extended or adjusted under 35 U.S.C. 154(b) by 613 days.

(21) Appl. No.: 18/349,384

(22) Filed: Jul. 10, 2023

(65) Prior Publication Data

US 2024/0353441 A1    Oct. 24, 2024

(30) Foreign Application Priority Data

Apr. 19, 2023    (CN) .......................... 202310421583.4

(51) Int. Cl.
| | |
|---|---|
| *G01F 5/00* | (2006.01) |
| *G01P 5/26* | (2006.01) |
| *G01P 13/02* | (2006.01) |

(52) U.S. Cl.
CPC ................ *G01P 5/26* (2013.01); *G01P 13/02* (2013.01)

(58) Field of Classification Search
CPC ... G01P 5/26; G01P 13/02; G01P 5/00; Y02A 90/10; G01H 3/00; G01L 11/025; G01L 11/02; G01L 1/242

USPC .......................................................... 356/28
See application file for complete search history.

(56) References Cited

U.S. PATENT DOCUMENTS

2017/0299806 A1 * 10/2017 Kopp ................ G02B 6/02042

FOREIGN PATENT DOCUMENTS

| | | | | | |
|---|---|---|---|---|---|
| BR | 202020014351 U2 | * | 1/2022 | ............. | G02B 27/28 |
| CA | 2948706 A1 | * | 12/2010 | ............. | G01K 11/32 |
| CN | 105954236 A | * | 9/2016 | .......... | G01N 21/554 |
| CN | 113405690 A | * | 9/2021 | ............. | G02B 6/25 |
| WO | WO-2014083989 A1 | * | 6/2014 | ............. | G01L 1/242 |
| WO | WO-2020230171 A1 | * | 11/2020 | ............. | D07B 5/00 |

* cited by examiner

*Primary Examiner* — Helal A Algahaim
*Assistant Examiner* — James W. Napier

(57) ABSTRACT

An ocean current detection device and method based on double-helix and double-core vibration fiber-optic cable, comprises a double-core fiber-optic cable and a φ-OTDR system; the double-core fiber-optic cable comprises a first and a second optical fiber core, provided symmetrically in the double helix structure. The terminate ends of the first and the second optical fiber core are connected, and the start end of the first or the second optical fiber core is connected with the φ-OTDR system. When measuring the ocean current characteristics in the target sea area, the double-core fiber-optic cable is provided underwater to generate vortex-induced vibration. The φ-OTDR system is provided for emitting laser towards the cable, receiving returned double-core vibration signals, extracting vibration characteristics from the double-core vibration signals to determine ocean current characteristics, including ocean current flow velocity and direction, to improve the detection accuracy.

10 Claims, 3 Drawing Sheets

OCEAN CURRENT DETECTION DEVICE AND METHOD BASED ON DOUBLE-HELIX AND DOUBLE-CORE VIBRATION FIBER-OPTIC CABLE

1. TECHNICAL FIELD

The invention relates to the field of ocean current detection, in particular to an ocean current detection device and method based on double-helix and double-core vibration fiber-optic cable.

2. BACKGROUND ART

According to the prior-art technology, the methods for measuring offshore ocean currents can be divided into two categories: current-contact type and non-current-contact type; wherein the main current-contact ocean current detectors are Rotating Current Meter, Acoustic Doppler Velocimeter (ADV), and the main non-current-contact ocean current detectors are Laser Doppler Velocimetry (LDV), Sea Environment Sounding & Analysis Radar (SESAR) and others.

The rotating current meter is one of the most widely used device for measuring flow velocity. The rotating current meter uses propellers and rotors to sense the flow velocity, to calculate the water flow velocity by measuring the rotational speed of the rotor. When the water flow passes through the rotor of the flowmeter, the linear motion energy of the water flow generates a torque on the rotor. This torque overcomes the internal friction including the inertia of the rotor and bearings, and the fluid resistance caused by the relative motion between the water flow and the rotor, driving the rotor of the flowmeter to rotate. Within a certain range of water flow velocities, the rotational speed of the rotor of the flowmeter has a relatively stable approximate linear relationship with the water flow velocity. Traditional rotating current meters have disadvantages such as high and unstable starting flow velocity, large size and inconvenience in use and portability. Such device tends to destroy the natural flow state of the water flow when measuring, affecting the measurement accuracy. When there are aquatic plants and floating objects in the water, the rotating shaft tends to be entangled by the floating objects, to cause a serious impact on the flow measurement and a safety threat to the flowmeter itself. In addition, due to the inertial effects driven by the water flow, it is difficult to determine instantaneous flow velocity and can generally only be used for routine average flow velocity measurements.

The Acoustic Doppler Velocimeter (ADV) is a flow velocity measurement system composed of Acoustic Doppler Current Profiler (ADCP) transducers, operating software systems, computers and connecting equipment. It is an instrument that uses the Doppler frequency shift generated by acoustic pulses emitted from acoustic transducers in suspended solids moving with the water flow to respond and calculate the water flow velocity. Compared with traditional rotating current meters, ADV does not destroy or disturb the flow field of river or channel water flow during flow measurement because it has no rotating or transmission mechanism, with higher sensitivity and better anti-interference ability. ADV can accurately reflect the water flow velocity regardless of the strength of the current, and also better solve the traditional rotating current meters due to the entanglement of water plants and debris in the water body affecting the measurement accuracy and other problems.

However, the undersea environment is complex. For example, thermal fluid ejection phenomena resembling black smokestacks will appear in undersea volcanic eruptions and continental plate movements. Such an environment is not conducive to the use of underwater communication equipment. Therefore, non-current-contact laser and radar flowmeters have been developed.

The measurement principle of Laser Doppler Velocimetry (LDV) is that the laser emitted by the laser irradiates moving particles through the transmission medium, and the irradiated area after collimation by the collimator is small. When the detection area contains moving impurity particles, a receiver direction is selected to receive the scattered light of impurity particles during this process. The scattered light carries the particle's velocity information, to solving the water flow velocity according to the relevant formulas, by detecting this Doppler frequency shift signal processing. Compared with traditional Acoustic Doppler Velocimeter (ADV), Laser Doppler Velocimetry (LDV) have advantages such as long service life and high sensitivity because the continuous working time of the laser is far beyond the life of piezoelectric ceramics, and the light wave frequency of the laser is far higher than the frequency of ultrasound. However, due to the complex and changeable undersea surface environment, suspended particles in the air and suspended organisms in seawater may affect the propagation path of the laser, leading to a certain impact on the measurement accuracy. In addition, Laser Doppler Velocimetry (LDV) also have problems including cumbersome equipment, high cost, and the requirements of skilled operators.

The working principle of SESAR is similar to that of Laser Doppler Velocimetry (LDV). The radar waves projected onto the sea surface will reflect after encountering the sea surface. There is a Doppler frequency shift between the reflected signal and the incident signal. A time window is provided in the received radio wave to analyze the spectral characteristics of the return signal filtered out in this time window, and the Doppler frequency shift theory can be used to invert the flow velocity of the sea surface at the corresponding distance in the time window. Although SESAR has higher measurement accuracy and sensitivity compared with traditional measurement methods, its anti-noise ability needs to be improved due to electromagnetic signal interference on the sea surface.

Therefore, the existing methods for measuring offshore ocean current flow velocity need to be improved in ocean current detection accuracy.

3. SUMMARY OF THE INVENTION

Based on the above background art, embodiments of the invention provide an ocean current detection device and method based on double-helix and double-core vibration fiber-optic cable to improve the accuracy of ocean current characteristic detection.

To achieve the above purpose, the embodiment has the following technical solutions:

An ocean current detection device based on double-helix and double-core vibration fiber-optic cable, comprises the double-core fiber-optic cable and the φ-OTDR system.

The double-core fiber-optic cable comprises the first optical fiber core and the second optical fiber core, provided symmetrically in the double helix structure; the terminate ends of the first optical fiber core and the second optical fiber core are connected, and the start end of the first optical fiber core or the second optical fiber core is connected with the φ-OTDR system.

When measuring the ocean current characteristics in the target sea area, the double-core fiber-optic cable is provided underwater in the target sea area to generate vortex-induced vibration; the φ-OTDR system is provided for emitting laser into the double-core fiber-optic cable, receiving returned double-core vibration signals, and extracting vibration characteristics from the double-core vibration signals and to determine ocean current characteristics in the target sea area according to the vibration characteristics, including ocean current flow velocity and ocean current flow direction.

Optionally, the φ-OTDR system comprises:

The digital demodulation module is provided for demodulating the double-core vibration signal to obtain the initial demodulated signal, and suppressing coherent fading noise in the initial demodulated signal by weighted mean method to obtain the noise suppression demodulated signal.

The characteristics extraction module is provided for extracting main vibration characteristics from the noise suppression demodulated signal; and the main vibration characteristics comprising vibration frequency of the double-core fiber-optic cable.

The ocean current flow velocity calculation module is provided for determining ocean current flow velocity of the target sea area according to the main vibration characteristics.

Optionally, the digital demodulation module comprises:

The signal demodulation unit is provided for demodulating the double-core vibration signal to obtain the initial demodulated signal.

The position determination unit is provided for accumulating the double-core vibration signals to determine the first position and the second position; the first position is the vibration signal position of the first optical fiber core in the double-core vibration signal, and the second position is the vibration signal position of the second optical fiber core in the double-core vibration signal.

The signal interception unit is provided for intercepting the vibration signal of the first optical fiber core from the initial demodulated signal to obtain the first demodulated signal, and intercepting the vibration signal of the second optical fiber core from the initial demodulated signal to obtain the second demodulated signal, based on the first position and the second position.

The signal inverting unit is provided for inverting the second demodulated signal to obtain the inverted demodulated signal.

The weighted summing unit is provided for providing the amplitude discrimination result of the first demodulated signal as the first weight coefficient, and providing the amplitude discrimination result of the inverted demodulated signal as the second weight coefficient; multiplying the first weight coefficient with the phase discrimination result of the first demodulated signal to obtain the first product, multiplying the second weight coefficient with the phase discrimination result of the inverted demodulated signal to obtain the second product, and summing the first product and the second product to obtain the noise suppression demodulated signal.

Optionally, the ocean current flow velocity calculation module comprises:

The flow velocity calculation unit is provided for calculating the ocean current flow velocity in the target sea area according to the formula $$v = \frac{f_s D}{St},$$

wherein, v represents the ocean current flow velocity in the target sea area, $f_s$ represents the vibration frequency of the double-core fiber-optic cable, D represents the diameter of the double-core fiber-optic cable, S represents the helix pitch of the double-core fiber-optic cable, and t represents time.

Optionally, the φ-OTDR system also comprises:

The ocean current flow direction determination module is provided for removing the main vibration characteristics from the noise suppression demodulated signal to obtain secondary vibration characteristics, determining the continuous distribution pattern of axial displacement of the double-core fiber-optic cable based on the secondary vibration characteristics along the double-core fiber-optic cable, and determining the radial ocean current flow direction of the target sea area according to the continuous distribution pattern of axial displacement.

Optionally, the helix pitch of the double-core fiber-optic cable satisfies the condition $S > \sqrt{400n^2 - (\pi d)^2}$, wherein n represents the minimum spatial resolution of the φ-OTDR system; d represents the diameter of the circle projected by the helical line.

The diameter of the double-core fiber-optic cable satisfies the condition $$10^5 > Re = \frac{vD}{\eta} > 200,$$

wherein Re represents the Reynolds number; η represents the dynamic viscosity coefficient of seawater.

To achieve the above objectives, embodiments of the invention also provide the following solutions:

An ocean current detection method based on double-helix and double-core vibration fiber-optic cable, provided for the ocean current detection device based on double-helix and double-core vibration fiber-optic cable, comprises the following steps:

Receiving the returned double-core vibration signals when the laser is emitted toward the double-core fiber-optic cable;

Extracting the vibration characteristics from the double-core vibration signals and determining the ocean current characteristics of the target sea area according to the vibration characteristics.

Optionally, the step of extracting the vibration characteristics from the double-core vibration signals and determining the ocean current characteristics of the target sea area according to the vibration characteristics, comprises the following steps:

Demodulating the double-core vibration signal to obtain the initial demodulated signal, and suppressing coherent fading noise of the initial demodulated signal by weighted mean method to obtain the noise suppression demodulated signal;

Extracting main vibration characteristics from the noise suppression demodulated signal; and the main vibration characteristics comprising vibration frequency of the double-core fiber-optic cable;

Determining ocean current flow velocity of the target sea area according to the main vibration characteristics; the ocean current characteristics comprises ocean current flow velocity and ocean current flow direction.

Optionally, the step of demodulating the double-core vibration signal to obtain the initial demodulated signal and suppressing coherent fading noise of the initial demodulated signal by weighted mean method to obtain the noise suppression demodulated signal, comprises the following steps:

Demodulating the double-core vibration signal to obtain the initial demodulated signal;

Accumulating the double-core vibration signals to determine the first position and the second position; the first position is the vibration signal position of the first optical fiber core in the double-core vibration signal, and the second position is the vibration signal position of the second optical fiber core in the double-core vibration signal;

Intercepting the vibration signal of the first optical fiber core from the initial demodulated signal to obtain the first demodulated signal, and intercepting the vibration signal of the second optical fiber core from the initial demodulated signal to obtain the second demodulated signal, based on the first position and the second position;

Inverting the second demodulated signal to obtain the inverted demodulated signal;

Providing the amplitude discrimination result of the first demodulated signal as the first weight coefficient, and providing the amplitude discrimination result of the inverted demodulated signal as the second weight coefficient; multiplying the first weight coefficient with the phase discrimination result of the first demodulated signal to obtain the first product, multiplying the second weight coefficient with the phase discrimination result of the inverted demodulated signal to obtain the second product, and summing the first product and the second product to obtain the noise suppression demodulated signal.

Optionally, the step of extracting main vibration characteristics from the noise suppression demodulated signal; and the main vibration characteristics comprising vibration frequency of the double-core fiber-optic cable, comprises the following steps:

Removing the main vibration characteristics from the noise suppression demodulated signal to obtain secondary vibration characteristics, determining the continuous distribution pattern of axial displacement of the double-core fiber-optic cable based on the secondary vibration characteristics along the double-core fiber-optic cable, and determining the radial ocean current flow direction of the target sea area according to the continuous distribution pattern of axial displacement.

According to the specific embodiments provided by the invention, the invention discloses the following technical effects:

The embodiment of the invention provides an ocean current detection device and method based on double-helix and double-core vibration fiber-optic cable. Based on the physical characteristics of the vortex-induced vibration phenomenon, the invention designs the double-core optical fiber and the double-core fiber-optic cable suitable for the φ-OTDR system. The double-core fiber-optic cable comprises the first optical fiber core and the second optical fiber core, provided symmetrically in the double helix structure, to realize the acquisition of the double-core vibration signal. The φ-OTDR system determines the ocean current characteristics of the target sea area according to the double-core vibration signal, including ocean current flow velocity and ocean current flow direction. The φ-OTDR system has the capabilities of high sensitivity, long distance, and all-weather monitoring to improve the accuracy of ocean current characteristic detection.

4. BRIEF DESCRIPTION OF ACCOMPANY DRAWINGS

To make the technical solutions provided by the invention more comprehensible, a further description of the invention is given below in combination with the attached drawings and embodiments, and the embodiments are exemplary and not the limitations of the scope of the disclosure. Apparently, the described drawings are merely some embodiments of the application rather than all the embodiments of the application. It should be understood that the application is not limited to the drawings described herein. Based on the drawings in the invention, all other drawings obtained by those of ordinary skill in the art without making creative labor fall within the scope of protection of the invention.

5. SPECIFIC EMBODIMENT OF THE INVENTION

To make the technical solutions provided by the invention more comprehensible, a further description of the invention is given below in combination with the attached drawings and embodiments, and the embodiments are exemplary and not the limitations of the scope of the disclosure. Apparently, the described drawings are merely some embodiments of the application rather than all the embodiments of the application. It should be understood that the application is not limited to the drawings described herein. Based on the drawings in the invention, all other drawings obtained by those of ordinary skill in the art without making creative labor fall within the scope of protection of the invention.

To make the above objectives, features and advantages of the invention more comprehensible, the invention will be further described in detail below in conjunction with the accompanying drawings and specific embodiments.

Embodiment 1

Figure 1:
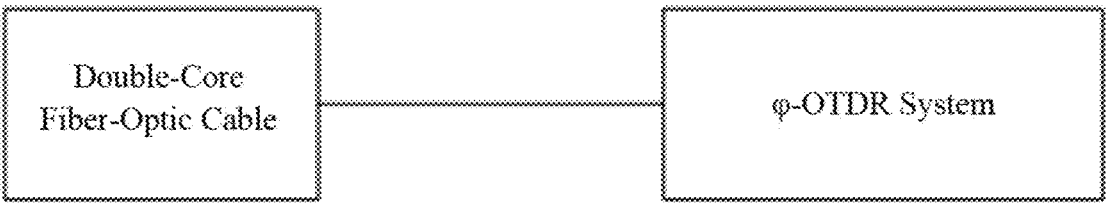
FIG. 1 is a schematic diagram showing the structure of an ocean current detection device based on double-helix double-core vibration fiber-optic cable according to the embodiment provided by the invention.

Referring to the FIG. 1, the embodiment provides the ocean current detection device based on double-helix and double-core vibration fiber-optic cable, comprising the double-core fiber-optic cable and the φ-OTDR system.

Figure 2:
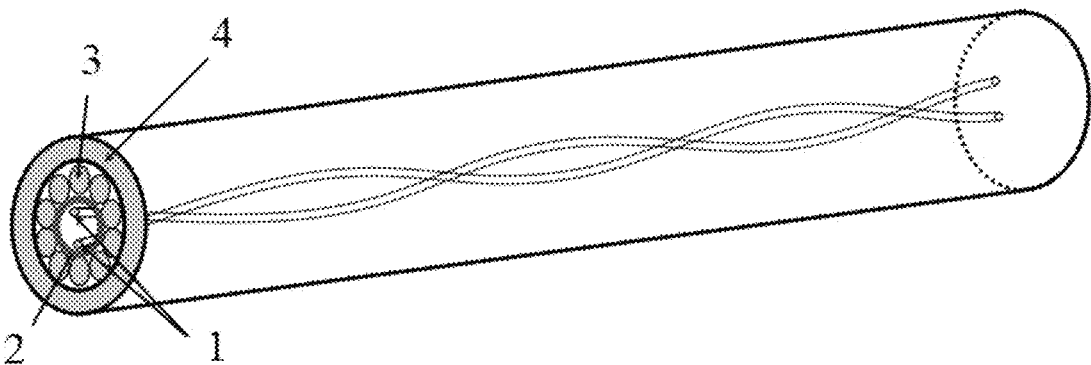
FIG. 2 is a schematic diagram showing the structure of a double-core fiber-optic cable according to the embodiment provided by the invention.

Referring to the FIG. 2, the double-core fiber-optic cable 1 comprises the first optical fiber core and the second optical fiber core, provided symmetrically in the double helix structure; the terminate ends of the first optical fiber core and the second optical fiber core are connected, and the start end of the first optical fiber core or the second optical fiber core is connected with the φ-OTDR system, allowing the φ-OTDR system to complete simultaneous measurement of two cores by connecting fiber optic cable in the single channel.

When measuring the ocean current characteristics in the target sea area, the double-core fiber-optic cable 1 is provided underwater in the target sea area to generate vortex-induced vibration; the φ-OTDR system is provided for emitting laser into the double-core fiber-optic cable, receiving returned double-core vibration signals, and extracting vibration characteristics from the double-core vibration signals and to determine ocean current characteristics in the target sea area according to the vibration characteristics, including ocean current flow velocity and ocean current flow direction.

The ocean current flow velocity includes: two velocity components, one is the radial ocean current flow velocity relative to the radial direction of the fiber-optic cable, and the other is the axial ocean current flow velocity relative to the axial direction of the fiber-optic cable. Similarly, the ocean current flow direction includes: two flow direction components, one is the radial ocean current flow direction relative to the radial direction of the fiber-optic cable, and the other is the axial ocean current flow direction relative to the axial direction of the fiber-optic cable.

To enable the double-core fiber-optic cable 1 to remain underwater in the target sea area, the double-core fiber-optic cable 1 is thrown into the target sea area along the predetermined route without burying during application, to be attached with weights to the end of the double-core fiber-optic cable 1.

As an optional embodiment, the helix pitch of the double-core fiber-optic cable 1 is determined according to the spatial resolution of the φ-OTDR system, and the specific method is as follows:

If the minimum spatial resolution of the φ-OTDR system is n meters, the circle diameter of the helical line and the cross-sectional projection is d meters, and the projected position of each adjacent two spatial resolutions of the optical fiber on the cross section does not exceed $\frac{1}{20}$ of the arc length of the spiral line projection, otherwise the accuracy of the subsequent algorithm will be affected. The method requires to set a reasonable helix pitch S to make the single turn helical length L satisfies the conditions L>20n, wherein the formula for the single turn helical length is:

$$L = \sqrt{(\pi d)^2 + S^2}$$

Therefore, the helix pitch S should satisfy the following condition:

$$S > \sqrt{400n^2 - (\pi d)^2}$$

In the embodiment, the length n is 2 meters, and d is 0.01 meter, and the minimum S should be 40 meters. At the same time, since the fiber-optic cable in the offshore ocean area can simultaneously cause continuous vortex-induced vibration with the general length of no more than 300 meters, from 80 to 160 meters, thus if the optical fiber containing multiple cycles of helical lines can obtain repeated measurement results to improve the algorithm accuracy, the helix pitch S should also satisfy the condition S<300. The embodiment adopts the helix pitch S as 60 to meet the above conditions. Therefore, the helix pitch S is directly related to the spatial resolution of the φ-OTDR system, and indirectly related to the undersea environment of the target sea area.

In addition to the helix pitch of the optical fibers in the cable, it is significant to select the diameter of the cable. The diameter of the cable is related to the depth and ocean current velocity of the target sea area, which needs to ensure that the cable can easily cause vortex-induced vibration effect in the ocean current of target sea area, and at the same time the vortex shedding frequency does not correspond to the inherent frequency of the cable to cause the resonance. Furthermore, the embodiment should ensure that at most times of the target sea area, the Strouhal number of the vortex-induced vibration phenomenon is within a certain range. The density of the cable needs to be able to naturally sink to the seabed of the target sea area. The specific diameter selection method of the cable is as follows.

Figure 3:
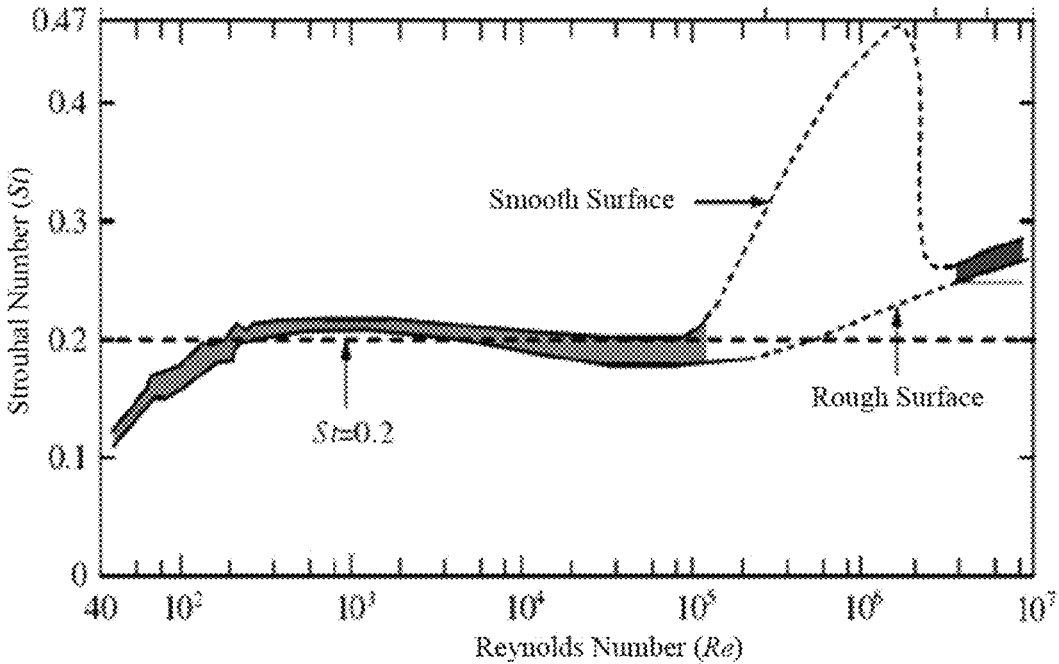
FIG. 3 is a relationship graph between the Strouhal number and Reynolds number of the fiber-optic cable wake model.

Referring to the FIG. 3, the curve shows that when the Reynolds number Re is within a certain range, the Strouhal number St of the vortex-induced vibration model generated by the cable disturbed flow is approximately 0.2, which is a constant. Therefore, the design of the diameter D of the double-core cable 1 needs to make Re between 200 and $10^5$. Therefore:

$$10^5 > Re = \frac{vD}{\eta} > 200$$

Wherein, v represents the ocean current flow velocity in the target sea area, which can take the average flow velocity at the bottom of the offshore sea; η represents the dynamic viscosity coefficient of seawater, which is affected by the temperature and depth in the sea area. The common-used vibration cable diameter D that can meet the requirements of most offshore exploration. In this embodiment, the diameter D of the double core cable 1 is 0.01 meters, the temperature of seawater is 283.15°, the density of seawater is 1027 kg/m³, and the dynamic viscosity of seawater is 0.0014 Pa*S. Therefore, when the ocean current flow velocity reaches 0.004 m/s, it can meet the prerequisite for accurate measurement. It is worth noting that only rough above parameters are needed to calculate the boundary of the diameter design of the cable before carrying out specific measurement in a particular sea area, and such boundary is the boundary for obtaining accurate measurement results. In actual application, exceeding the boundary will only make the measurement results for that period inaccurate, but it will not affect the accuracy of long-term measurement results with days.

Referring to the FIG. 2, as an optional embodiment, the embodiment takes GYXTS-2B1.1-type outdoor center tube petrojelly-filling single-mode communication fiber-optic cable with steel belt longitudinal application as the example. The double-core fiber-optic cable 1 also comprises: an inner protective sleeve 2, armor 3 and outer protective sleeve 4. The exterior of the first optical fiber core and the second optical fiber core are encapsulated by the inner protective sleeve 2; the armor 3 is provided outside the inner protective sleeve 2; the outer protective sleeve 4 encapsulates the armor 3 from outside. The inner protective sleeve 2, armor 3 and outer protective sleeve 4 can adopt the non-helical structure.

The armor material of the fiber-optic cable and the selection of the inner and outer protective sleeves need to make the overall equivalent density of the fiber-optic cable greater than the seawater density above the seabed of the offshore sea area to be measured. It is worth noting that even if the density of the double core fiber-optic cable 1 is not enough to make the cable sink to the seabed, the characteristics of the ocean current at the depth can still be measured, and under limited conditions, heavy objects can be tied every 100 to 200 meters to help the fiber-optic cable sink.

Since the material and diameter of the fiber-optic cable determine the mass and damping coefficient, parameters need to be selected to make the inherent vibration frequency of the fiber-optic cable generating vortex-induced vibration not in the range of 1 to 5 Hz, to avoid resonance affecting the measurement results. In this embodiment, the inherent vibration frequency of the cable under vortex-induced vibration is basically below 0.01, meeting the requirements. It is worth mentioning that most vibration sensing fiber-optic cables do not need to consider the resonance problem in offshore sea areas, while it is necessary to consider avoiding the damage of fiber-optic cable caused by resonance, when using photoelectronic composite cables to measure offshore ocean currents by the patent method.

Figure 4:
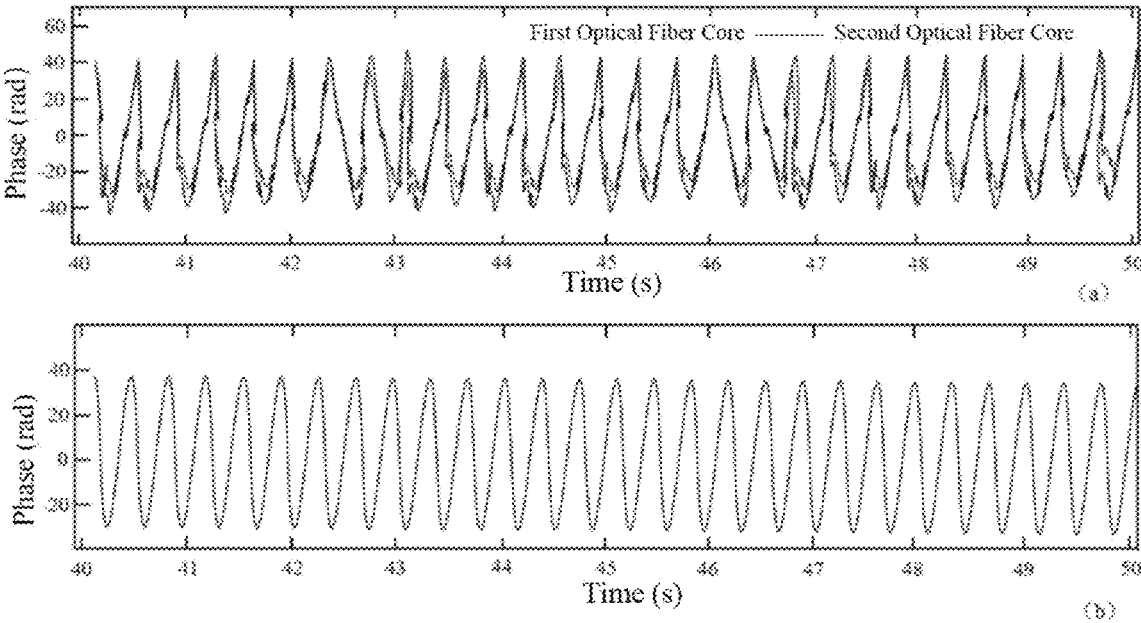
FIG. 4 is a schematic diagram showing the phase comparison of the two cores and the phase after weighted mean when the double-core fiber-optic cable measures the ocean current.

As an optional embodiment, the φ-OTDR system comprises:

The digital demodulation module is provided for demodulating the double-core vibration signal to obtain the initial demodulated signal and suppressing coherent fading noise in the initial demodulated signal by weighted mean method to obtain the noise suppression demodulated signal. Weighted mean method is provided for obtaining the continuous double-core vibration signals of the double-core fiber-optic cable and accumulating them to obtain the boundary points with or without the optical fiber positions, to determine the position of each fiber core signal in the overall signal. The vibration signals of the double cores can be extracted from the demodulated results respectively, and the demodulated result of the second optical fiber core needs to be inverted to align with the first optical fiber core. Due to the influence of coherent fading noise, to overcome the deterioration of the signal-to-noise ratio caused by random coherent fading and detection dead zones, the amplitude discrimination results obtained from the double cores respectively are used as weighting coefficients to multiply the phase discrimination results obtained from the double cores respectively, and the results are added up to obtain the weighted mean result. As shown in FIG. 4, the noise suppression demodulated signal can be obtained; wherein the part (a) of FIG. 4 shows the respective phases of the double cores of the double core fiber-optic cable when measuring ocean currents in the target sea area, and part (b) of FIG. 4 shows the phase of the double cores of the double core fiber-optic cable after weighted mean when measuring ocean currents in the target sea area.

The characteristics extraction module is provided for extracting main vibration characteristics from the noise suppression demodulated signal; and the main vibration characteristics comprising vibration frequency of the double-core fiber-optic cable. Specifically, the double-core vibration signals after weighted mean can suppress coherent fading noise, and also suppress vibration characteristics other than the direction of downward vortex shedding when the vortex-induced vibration caused by the ocean current in the radial direction of the fiber-optic cable. Since the Strouhal number is ensured within a certain range during vortex-induced vibration, the remaining vibration characteristics are the main vibration characteristics of the double-core fiber-optic cable when vortex shedding.

The ocean current flow velocity calculation module is provided for determining ocean current flow velocity of the target sea area according to the main vibration characteristics. Specifically, the vibration frequency f of the double-core fiber-optic cable is consistent with the vortex shedding frequency and is proportional to the incoming flow velocity, to calculate the incoming flow velocity in the radial direction of the fiber-optic cable, which is the ocean current flow velocity v in the target sea area.

As an optional embodiment, the digital demodulation module comprises:

The signal demodulation unit is provided for demodulating the double-core vibration signal to obtain the initial demodulated signal.

The position determination unit is provided for accumulating the double-core vibration signals to determine the first position and the second position; the first position is the vibration signal position of the first optical fiber core in the double-core vibration signal, and the second position is the vibration signal position of the second optical fiber core in the double-core vibration signal.

The signal interception unit is provided for intercepting the vibration signal of the first optical fiber core from the initial demodulated signal to obtain the first demodulated signal, and intercepting the vibration signal of the second optical fiber core from the initial demodulated signal to obtain the second demodulated signal, based on the first position and the second position.

The signal inverting unit is provided for inverting the second demodulated signal to obtain the inverted demodulated signal.

The weighted summing unit is provided for providing the amplitude discrimination result of the first demodulated signal as the first weight coefficient, and providing the amplitude discrimination result of the inverted demodulated signal as the second weight coefficient; multiplying the first weight coefficient with the phase discrimination result of the first demodulated signal to obtain the first product, multiplying the second weight coefficient with the phase discrimination result of the inverted demodulated signal to obtain the second product, and summing the first product and the second product to obtain the noise suppression demodulated signal.

As an optional embodiment, the ocean current flow velocity calculation module comprises:

The flow velocity calculation unit is provided for calculating the ocean current flow velocity in the target sea area according to the formula $$v = \frac{f_s D}{St},$$

wherein, v represents the ocean current flow velocity in the target sea area, $f_s$ represents the vibration frequency of the double-core fiber-optic cable, D represents the diameter of the double-core fiber-optic cable, S represents the helix pitch of the double-core fiber-optic cable, and t represents time.

As an optional embodiment, when the vortex-induced vibration phenomenon occurs, the main vibration characteristic of the double-core fiber-optic cable is reflected in its frequency being consistent with the lift change frequency caused by vortex shedding, while the secondary vibration characteristic comprises: the drag frequency generated by the paired vortex shedding being half of the lift, and at the same time, the axial force of the flexible fiber-optic cable cannot be ignored, with axial displacement consistent with the lift frequency at various positions of the cable core. For the double-core optical fibers symmetrically distributed with respect to the center point of the fiber-optic cable cross-section, their axial displacement directions are opposite, and the amplitude is related to the connection line between the double-core fibers in the cross-section and the ocean current direction. By using the double-helix double-core fiber-optic cable, and demodulating the continuous distribution rule of axial displacement of the double-core fiber-optic cable over hundreds of meters, the specific direction of the radial incoming flow of the double-core fiber-optic cable can be inferred.

Therefore, the φ-OTDR system also comprises: the ocean current flow direction determination module.

The ocean current flow direction determination module is provided for removing the main vibration characteristics from the noise suppression demodulated signal to obtain secondary vibration characteristics, determining the continuous distribution pattern of axial displacement of the double-core fiber-optic cable based on the secondary vibration characteristics along the double-core fiber-optic cable, and determining the radial ocean current flow direction of the target sea area according to the continuous distribution pattern of axial displacement.

Figure 5:
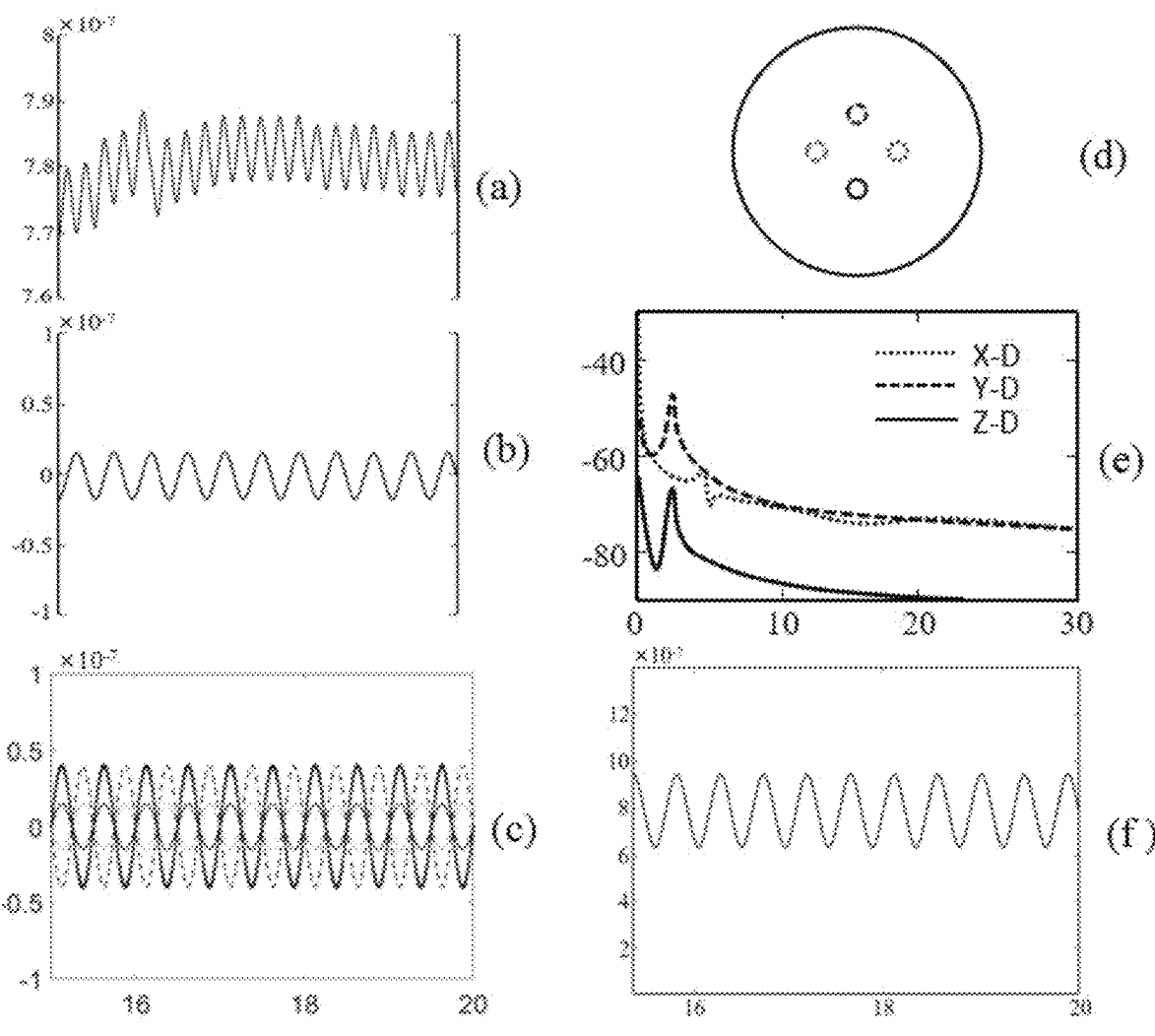
FIG. 5 is a schematic diagram showing the simulation calculation of optical fiber's three-dimensional displacement at 4 positions on the cross-section of the fiber-optic cable vortex-induced vibration center.

Referring to FIG. 5, wherein the part (a) of FIG. 5 reflects the displacement (X-D) in the X direction of the double cores at typical symmetrical positions along the horizontal line; part (b) of FIG. 5 reflects the displacement (Y-D) in the Y direction of the double cores at typical symmetrical positions along the horizontal line; part (c) of FIG. 5 reflects the displacement (Z-D) in the Z direction of the double cores at typical symmetrical positions along the horizontal line; part (d) of FIG. 5 shows the position of the cores in the cross section; part (e) of FIG. 5 shows the frequencies of displacement changes in the X, Y and Z directions; part (f) of FIG. 5 shows the optical fiber phase measured by the system caused by the displacement changes in the X, Y and Z directions. As shown in FIG. 5, by simulation calculation of optical fiber's three-dimensional displacement at 4 positions on the cross-section of the fiber-optic cable vortex-induced center, it is observed that the axial displacement direction of the optical fibers at two symmetrical positions are opposite, and the axial displacement amplitude is smaller as the angle between their connection line and the incoming direction is smaller. While the two symmetrically positioned fiber cores have consistent displacement patterns in the two directions perpendicular to the radial direction, one of which is consistent with the lift frequency and the other is consistent with the drag frequency. The simulation calculation verifies the feasibility of the ocean current direction determination method.

As an optional embodiment, when the ocean current has a strong component along the axial direction of the fiber-optic cable, the overall axial deformation of that fiber-optic cable section will be deformed, and there is an overall bias with the phase change caused by the demodulated fiber-optic cable axial deformation, thus determining the axial component of the ocean current. Simultaneously, since the fiber-optic cable is not strictly linearly distributed in the ocean, the axial direction of the fiber-optic cable section may have radial components with respect to other sections, which can be discerned by the method of determining the ocean current flow direction.

Therefore, the φ-OTDR system also comprises: the ocean current axial component determination module.

The ocean current axial component determination module is used to determine the axial component of the ocean current based on the overall bias between the overall axial deformation of the double-core fiber-optic cable and the phase change caused by the double-core fiber-optic cable axial deformation. The axial component of the ocean current comprises: the flow velocity of the axial ocean current and the flow velocity of the co-axial ocean current.

In this embodiment of the φ-OTDR system, the demodulated double-core vibration signal is based on the weighted mean of the amplitude and phase of the two, suppressing coherent fading noise and eliminating the secondary vibration mode of the fiber-optic cable, extracting the main vibration characteristic of the fiber-optic cable to determine the ocean current flow velocity in the radial direction; separately removing the main vibration characteristic from the double-core vibration signals to obtain the secondary vibration characteristic of the fiber-optic cable, and determining the ocean current flow direction in the radial direction of the fiber-optic cable based on the slow changes of the secondary vibration characteristic along the helical structure of each double-core fiber; and determining the flow characteristics of the axial ocean current with respect to the fiber-optic cable based on the amplitude shift of the main and secondary vibration characteristics.

Compared to the operations in the offshore areas that usually need to avoid the vortex-induced vibration phenomenon causing damage to the submarine cables or other devices, this embodiment captures the physical characteristics of the vortex-induced vibration phenomenon, innovatively designs the standardized modification of existing sensing fiber-optic cables, combines the high sensitivity, long-distance, and all-weather monitoring capabilities of the φ-OTDR system, adapts the vibration signal restoration algorithm, to achieve accurate monitoring of ocean current characteristics, including ocean current flow velocity and ocean current flow direction.

Embodiment 2

To realize the device corresponding to the above embodiment 1 and to achieve the corresponding functions and technical effects, the embodiment 2 provides a method for ocean current detection based on double-helix and double-core vibration fiber-optic cable.

A method for ocean current detection based on double-helix and double-core vibration fiber-optic cable, provided for the ocean current detection device based on double-helix and double-core vibration fiber-optic cable as claimed in claim 6, wherein comprises the following steps:

(I) Receiving the returned double-core vibration signals when the laser is emitted toward the double-core fiber-optic cable.

(II) Extracting the vibration characteristics from the double-core vibration signals, and determining the ocean current characteristics of the target sea area according to the vibration characteristics; and the ocean current characteristics comprises: ocean current flow velocity and ocean current flow direction.

Specifically comprises the following steps:

(1) Demodulating the double-core vibration signal to obtain the initial demodulated signal;

accumulating the double-core vibration signals to determine the first position and the second position; the first position is the vibration signal position of the first optical fiber core in the double-core vibration signal, and the second position is the vibration signal position of the second optical fiber core in the double-core vibration signal;

intercepting the vibration signal of the first optical fiber core from the initial demodulated signal to obtain the first demodulated signal, and intercepting the vibration signal of the second optical fiber core from the initial demodulated signal to obtain the second demodulated signal, based on the first position and the second position;

inverting the second demodulated signal to obtain the inverted demodulated signal;

providing the amplitude discrimination result of the first demodulated signal as the first weight coefficient, and providing the amplitude discrimination result of the inverted demodulated signal as the second weight coefficient; multiplying the first weight coefficient with the phase discrimination result of the first demodulated signal to obtain the first product, multiplying the second weight coefficient with the phase discrimination result of the inverted demodulated signal to obtain the second product, and summing the first product and the second product to obtain the noise suppression demodulated signal.

(2) Extracting main vibration characteristics from the noise suppression demodulated signal; and the main vibration characteristics comprising vibration frequency of the double-core fiber-optic cable.

(3) Determining ocean current flow velocity of the target sea area according to the main vibration characteristics.

As an optional embodiment, the embodiment comprises the following steps after the step (3):

Removing the main vibration characteristics from the noise suppression demodulated signal to obtain secondary vibration characteristics, determining the continuous distribution pattern of axial displacement of the double-core fiber-optic cable based on the secondary vibration characteristics along the double-core fiber-optic cable, and determining the radial ocean current flow direction of the target sea area according to the continuous distribution pattern of axial displacement.

The various embodiments of the specification are described progressively, and each embodiment focuses on the differences from the other embodiments. The same or similar parts between the embodiments can refer to each other.

The invention and the specific embodiments thereof are described in detail hereinabove to illustrate the principles and implementations of the invention, and this description is not restrictive. The above embodiments are only used to help understand the methods and core ideas of the invention, and the actual structure is not limited thereto. Meanwhile, those skilled in the art can make modifications to the specific implementation and application scope based on the ideas of the invention. In summary, the content of the specification should not be construed as limiting the invention.

The invention claimed is:

1. An ocean current detection device based on double-helix and double-core vibration fiber-optic cable, wherein comprises a double-core fiber-optic cable and a φ-OTDR (Phase-Optical Time Domain Reflectometry) system; the double-core fiber-optic cable comprises a first optical fiber core and a second optical fiber core, provided symmetrically in the double helix structure; the terminate ends of the first optical fiber core and the second optical fiber core are connected to each other, providing a single channel, double helix, optical fiber; and the start end of the first optical fiber core or the second optical fiber core is connected with the φ-OTDR system; when measuring the ocean current characteristics in the target sea area, the double-core fiber-optic cable is provided underwater in the target sea area to generate vortex-induced vibration; and the φ-OTDR system is provided for emitting laser towards the double-core fiber-optic cable, receiving returned double-core vibration signals and extracting vibration characteristics from the double-core vibration signals to determine ocean current characteristics in the target sea area according to the vibration characteristics, including ocean current flow velocity and ocean current flow direction.

2. An ocean current detection device based on the single channel double-helix and double-core vibration fiber-optic cable as claimed in claim 1, wherein the φ-OTDR system comprises: a digital demodulation module for demodulating the double-core vibration signal to obtain the initial demodulated signal, and suppressing coherent fading noise in the initial demodulated signal by weighted mean method to obtain the noise suppression demodulated signal; a characteristics extraction module for extracting main vibration characteristics from the noise suppression demodulated signal; and the main vibration characteristics comprising vibration frequency of the double-core fiber-optic cable; an ocean current flow velocity calculation module for determining ocean current flow velocity of the target sea area according to the main vibration characteristics.

3. An ocean current detection device based on the single channel double-helix and double-core vibration fiber-optic cable as claimed in claim 2, wherein the digital demodulation module comprises: a signal demodulation unit for demodulating the double-core vibration signal to obtain the initial demodulated signal; a position determination unit for accumulating the double-core vibration signals to determine the first position and the second position; the first position is the vibration signal position of the first optical fiber core in the double-core vibration signal, and the second position is the vibration signal position of the second optical fiber core in the double-core vibration signal; a signal interception unit for intercepting the vibration signal of the first optical fiber core from the initial demodulated signal to obtain the first demodulated signal, and intercepting the vibration signal of the second optical fiber core from the initial demodulated signal to obtain the second demodulated signal, based on first position and the second position; a signal inverting unit for inverting the second demodulated signal to obtain the inverted demodulated signal; a weighted summing unit for providing the amplitude discrimination result of the first demodulated signal as the first weight coefficient, and providing the amplitude discrimination result of the inverted demodulated signal as the second weight coefficient; multiplying the first weight coefficient with the phase discrimination result of the first demodulated signal to obtain the first product, multiplying the second weight coefficient with the phase discrimination result of the inverted demodulated signal to obtain the second product, and summing the first product and the second product to obtain the noise suppression demodulated signal.

4. An ocean current detection device based on the single channel double-helix and double-core vibration fiber-optic cable as claimed in claim 2, wherein the ocean current flow velocity calculation module comprises: a flow velocity calculation unit for calculating the ocean current flow velocity in the target sea area according to the formula $$V=(f_s D/St)$$

wherein V represents the ocean current flow velocity in the target sea area, $f_s$ represents the vibration frequency of the double-core fiber-optic cable, D represents the diameter of the double-core fiber-optic cable, S represents the helix pitch of the double-core fiber-optic cable, and t represents time.

5. An ocean current detection device based on the single channel double-helix and double-core vibration fiber-optic cable as claimed in claim 2, wherein the φ-OTDR system also comprises: an ocean current flow direction determination module for removing the main vibration characteristics from the noise suppression demodulated signal to obtain secondary vibration characteristics, determining the continuous distribution pattern of axial displacement of the double-core fiber-optic cable based on secondary vibration characteristics along the double-core fiber-optic cable, and determining the radial ocean current flow direction of the target sea area according to the continuous distribution pattern of axial displacement.

6. An ocean current detection device based on the single channel double-helix and double-core vibration fiber-optic cable as claimed in claim 4, wherein the helix pitch of the double-core fiber-optic cable satisfies the condition $$S>(400n^2-(\pi d)^2)^{1/2}$$

wherein n represents the minimum spatial resolution of the φ-OTDR system; d represents the diameter of the circle projected by the helical line; and the diameter of the double-core fiber-optic cable satisfies the condition $10^5>Re=(vD/\eta)>200$, wherein Re represents the Reynolds number; η represents the dynamic viscosity coefficient of seawater.

7. An ocean current detection method based on the single channel double-helix and double-core vibration fiber-optic cable, provided for the ocean current detection device based on a double-helix and double-core vibration fiber-optic cable as claimed in claim 6, wherein comprises the following steps: receiving the returned double-core vibration signals when a laser is emitted towards the double-core fiber-optic cable; extracting the vibration characteristics from the double-core vibration signals and determining the ocean current characteristics of the target sea area according to the vibration characteristics; and the ocean current characteristics comprising ocean current flow velocity and ocean current flow direction.

8. An ocean current detection method based on the single channel double-helix and double-core vibration fiber-optic cable as claimed in claim 7, wherein the step of extracting the vibration characteristics from the double-core vibration signals and determining the ocean current characteristics of the target sea area according to the vibration characteristics, comprises the following steps: demodulating the double-core vibration signal to obtain the initial demodulated signal, and suppressing coherent fading noise of the initial demodulated signal by weighted mean method to obtain the noise suppression demodulated signal; extracting main vibration characteristics from the noise suppression demodulated signal; and the main vibration characteristics comprising vibration frequency of the double-core fiber-optic cable; determining ocean current flow velocity of the target sea area according to the main vibration characteristics.

9. An ocean current detection method based on the single channel double-helix and double-core vibration fiber-optic cable as claimed in claim 8, wherein the step of demodulating the double-core vibration signal to obtain the initial demodulated signal and suppressing coherent fading noise of the initial demodulated signal by weighted mean method to obtain the noise suppression demodulated signal, comprises the following steps: demodulating the double-core vibration signal to obtain the initial demodulated signal; accumulating the double-core vibration signals to determine the first position and the second position; the first position is the vibration signal position of the first optical fiber core in the double-core vibration signal, and the second position is the vibration signal position of the second optical fiber core in the double-core vibration signal; intercepting the vibration signal of the first optical fiber core from the initial demodulated signal to obtain the first demodulated signal, and intercepting the vibration signal of the second optical fiber core from the initial demodulated signal to obtain the second demodulated signal, based on first position and the second position; inverting the second demodulated signal to obtain the inverted demodulated signal; providing the amplitude discrimination result of the first demodulated signal as the first weight coefficient, and providing the amplitude discrimination result of the inverted demodulated signal as the second weight coefficient; multiplying the first weight coefficient with the phase discrimination result of the first demodulated signal to obtain the first product, multiplying the second weight coefficient with the phase discrimination result of the inverted demodulated signal to obtain the second product, and summing the first product and the second product to obtain the noise suppression demodulated signal.

10. An ocean current detection method based on the single channel double-helix and double-core vibration fiber-optic cable as claimed in claim 8, wherein the step of extracting main vibration characteristics from the noise suppression demodulated signal; and the main vibration characteristics comprising vibration frequency of the double-core fiber-optic cable, comprises the following steps: removing the main vibration characteristics from the noise suppression demodulated signal to obtain secondary vibration characteristics, determining the continuous distribution pattern of axial displacement of the double-core fiber-optic cable based on secondary vibration characteristics along the double-core fiber-optic cable, and determining the radial ocean current flow direction of the target sea area according to the continuous distribution pattern of axial displacement.

\* \* \* \* \*